United States Patent [15] 3,684,929
Leifield [45] Aug. 15, 1972

[54] ELECTROLYTIC CAPACITOR ANODE COMPRISING OXIDE FILMED HOLLOW BODIES

[72] Inventor: Robert F. Leifield, Erie, Pa.

[73] Assignee: Mallinckrodt Chemical Works, St. Louis, Mo.

[22] Filed: July 31, 1969

[21] Appl. No.: 846,550

[52] U.S. Cl. .................................. 317/230, 29/570
[51] Int. Cl. ............................................. H01g 9/05
[58] Field of Search .............. 317/230, 231, 232, 233

[56] References Cited

UNITED STATES PATENTS

| | | | |
|---|---|---|---|
| 2,406,345 | 8/1946 | Brennan | 317/230 |
| 3,248,612 | 4/1966 | Rogers | 317/230 |
| 3,302,073 | 1/1967 | Broodo | 317/230 |
| 3,325,698 | 6/1967 | Mooneyhan | 317/230 |
| 3,506,885 | 4/1970 | Roberts et al. | 317/230 |

*Primary Examiner*—James D. Kallam
*Attorney*—Koenig, Senniger, Powers and Leavitt

[57] ABSTRACT

An anode for an electrolytic capacitor is fabricated by forming an electrically integral porous mass of particles which have cores with a discontinuous coating of a valve metal thereon and the coating has an exposed outer surface. At least a substantial portion of the inner surface of the valve metal coating is exposed to increase the exposed surface area of the valve metal in the mass. The exposed valve metal surfaces are then anodized.

4 Claims, 4 Drawing Figures

FIG. 1

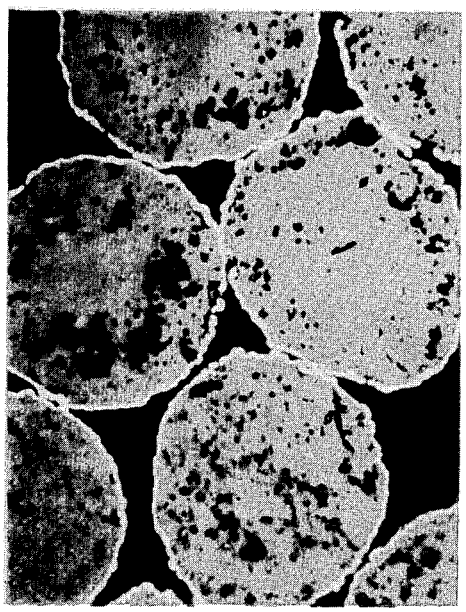
FIG. 1
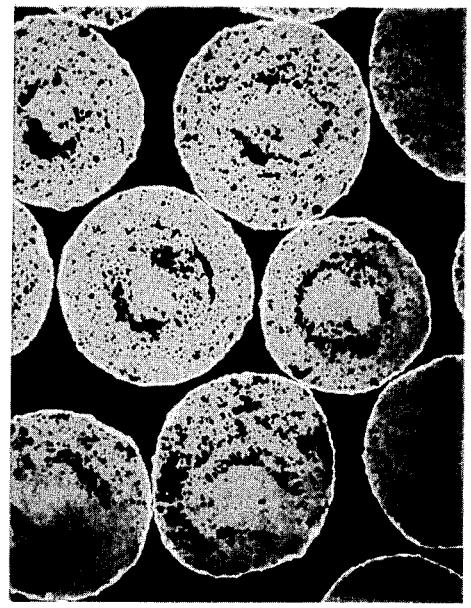
FIG. 2
FIG. 3
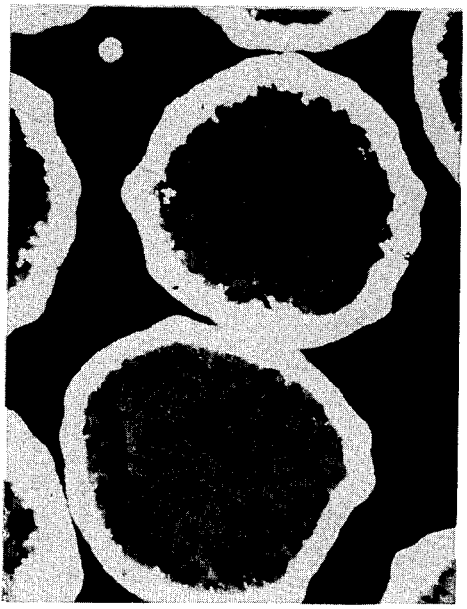
FIG. 4
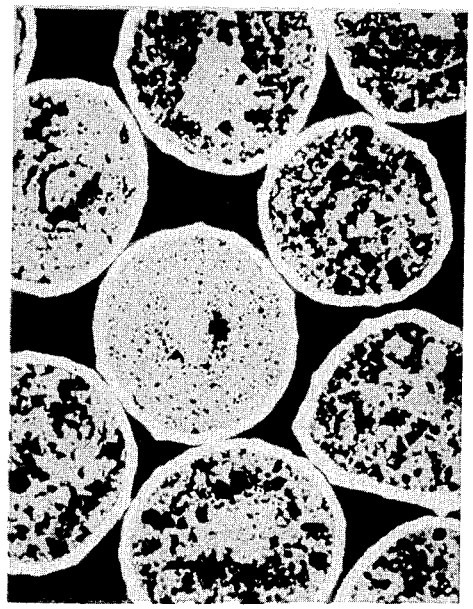

ELECTROLYTIC CAPACITOR ANODE COMPRISING OXIDE FILMED HOLLOW BODIES

BACKGROUND OF THE INVENTION

This invention relates to electrolytic capacitors and more particularly to the anodes therefor and the fabrication thereof.

In such capacitors a porous body of valve metal is provided, typically by compressing powdered valve metal into a pellet, which is then usually sintered. As used herein the term "valve metal" has its usual definition — a metal which can be treated to permit a flow of current in one direction only. The resultant porous pellet is then electrolytically oxidized or anodized to coat the surfaces of the particles with a thin film of oxide. The oxide coating should be amorphous and not crystalline for best results. The electrolyte can be solid or liquid, the main requirement being that it be a material which has relatively high conductivity. For a wet capacitor, the sintered pellet is saturated with an aqueous electrolyte and the moist pellet is enclosed in a metallic jacket. For a dry or solid capacitor, the anodized pellet typically is immersed in a solution such as manganese nitrate and is then heated to pyrolize the manganese nitrate to manganese dioxide, which acts as a semiconductive dry electrolyte. Other appropriate materials may be used, manganese dioxide being noted only by way of example. The pellet is then impregnated with a dispersion of graphite to provide satisfactory electrical contact with the semiconductor, followed by applying a metallic layer of lead alloy, copper, etc., to form a metallic jacket enclosing the capacitor.

The thin film of oxide forms a dielectric between the metallic anode, which functions as one electrode of the capacitor, and the electrolyte, which functions as the other electrode. In the dry capacitor, the graphite provides an electrically conductive connection between the electrolyte and the metal case, to which one of the electrical leads is connected. The other electrical lead can be embedded in the pellet in the conventional manner. Haring et al. U.S. Pat. No. 3,166,693 shows a typical dry capacitor.

The desired characteristics of electrolytic capacitors include high capacitance, low dissipation factor, low equivalent series resistance, low leakage current (i.e., the current which flows when a specified d.c. voltage is applied across the capacitor), and high reliability under conditions of use.

The capacitance of a capacitor is a function of the materials and the geometry of construction. For a given material in an electrolytic capacitor, the capacitance varies directly with the surface area of the electrodes, directly with the dielectric constant of the oxide film, and inversely as the distance separating the electrodes. In an electrolytic capacitor, the distance separating the electrodes is the thickness of the oxide film on the valve metal. The film thickness is proportional to and controlled by the maximum voltage applied during anodization and the length of time of anodization. The unit has rectifying properties, blocking current when the oxide film coated electrode is made the anode, and passing current when it is made the cathode. The fact that capacitance is dependent upon the surface area of the valve metal rather than upon its volume or weight makes it important for maximum efficiency in the utilization of valve metal that maximum surface area be achieved and maintained during the fabrication of a capacitor.

Although the valve metal desirably may be niobium, tantalum, aluminum, tungsten, hafnium, titanium or zirconium, or alloys thereof, e.g., a niobium tantalum alloy, it has been found that oxides of certain of the rarer of these metals, such as tantalum and niobium and niobium tantalum alloys possess particularly desirable properties such as having high dielectric constants and change from amorphous to crystalline form quite slowly. However, these metals are quite expensive. Accordingly, it has long been sought to improve the properties of capacitors while at the same time reducing the amount of valve metal that had to be used. Rogers U.S. Pat. No. 3,248,612 discloses the concept of using particles which comprise minute particles of inert refractory material covered with continuous film coatings of valve metal. This concept somewhat reduces the amount of tantalum or other valve metal required for a given capacitance, but the particles still are at least 40 percent valve metal.

SUMMARY OF THE INVENTION

It is an object of this invention to provide an electrolytic capacitor which has higher capacitance per unit volume with little, if any, adverse effect upon the other desirable properties of low dissipation factor and equivalent series resistance, low leakage current and high reliability under conditions of use. It is a further object of this invention to provide an electrode for use in a capacitor which has an extended surface compared to prior art capacitors containing an equivalent amount of valve metal. Other objects and features will be in part apparent and in part pointed out hereinafter.

According to the present invention, an electrically integral porous mass of particles (i. e., a porous mass of (electrically interconnected) particles). is formed, the particles having a core with a discontinuous coating of a valve metal and the coating having an exposed outer surface. At least a substantial portion of the inner surface of the valve metal is exposed to increase the exposed surface area of the valve metal in the mass and the exposed valve metal surfaces are anodized.

In forming the electrically integral porous mass, the particles are compressed and then preferably sintered. The inner surfaces of the valve metal coatings are exposed to increase the exposed surface area by divers methods. One particularly effective method for effecting this is by using an appropriate solvent selectively to dissolve at least a portion of the core or substrate without significantly attacking the valve metal. As the valve metal coatings are discontinuous the solvent can selectively attack the core and leach this material so that the valve metal in the resultant mass will be in the form of substantially hollow bodies having exposed internal and external surfaces, both of which can be anodized. This effectively doubles the surface area of the mass.

The particle cores are desirably a ceramic or refractory material, for example, a material such as uranium dioxide, high-fired lime or calcium oxide particles, thorium oxide and lanthanum oxide or any other material in particulate form on which the valve metal can be deposited and which is readily soluble in the selective solvent material without the formation of products which are insoluble in the solvent material. These cores are preferably not more than about 160 microns in size and may be much smaller. The thickness of the valve metal coating on each particle is not more than about 8 microns and preferably not more than about 2 microns in thickness. This insures a high ratio of surface area to volume, and, when the valve metal is coated on the core, this will help insure that a discontinuous layer is formed.

BRIEF DESCRIPTION OF THE DRAWINGS

FIGS. 1-4 inclusive are photomicrographs of cross sections of valve metal coated particles used in the practice of this invention.

DESCRIPTION OF THE PREFERRED EMBODIMENT

In fabricating the anodes of the present invention particles of a ceramic or refractory material, such as uranium dioxide, or high-fired calcium oxide or lime particles, thorium oxide, lanthanum oxide, etc., are coated with a thin coating of the valve metal by any suitable method. One effective technique is by vapor deposition of the valve metal, e.g., tantalum or niobium, on the surfaces of the uncoated particles in a fluidized bed reactor. In such a process, the particles to be coated are fluidized, i.e., suspended, in a heated reactor by a stream of gas which can be one of the reactants in the reaction being used. The gas velocity required for fluidization or particle suspension depends primarily upon the particle size and density and to a lesser extent on the gas viscosity and density, particle shape and the reactor design. Reactant gases are premixed with the fluidizing gas, or, in cases where premature reaction would otherwise occur, are injected at separate points and mixed in the bed. Typically the process involves the decomposition of a halide of the metal to be applied as a coating, e.g., tantalum chloride or niobium chloride. In this case, hydrogen is used as the fluidizing gas. The reaction between the hydrogen and the halide at about 700°–800° C. reducing the halide with the formation of the elemental metal and hydrogen halide results in the deposition of a film or coating of the valve metal upon the core.

Other conventional coating techniques are also useful. As a decrease in the size of the particles increases the surface area per unit volume, it is desirable that the particles be quite small, e.g., less than about 160 microns and as small as 1-5 microns. As it is difficult to control a fluidized bed where the particles are in the lower portion of this range, other techniques known to those skilled in the art, such as a vibrating or "jiggle" bed, are useful for coating such smaller size particles.

A number of different size core particles were coated with valve metal in a fluidized bed. The resultant coated particles were then suspended in a matrix formed by a cold setting transparent casting resin, e.g., an epoxy or methacrylate resin (such as those sold under the trade designations Epon Castolite or Araldite), and the cured resin-particle mass was sectioned and photomicrographs were taken.

Referring now to the drawings, FIG. 1 shows particles of uranium dioxide (80 microns) with a 2-micron thick coating of tantalum (540x magnification), while FIG. 2 illustrates uranium dioxide particles (160 microns) with a 2-micron thick coating of tantalum (213x magnification). FIG. 3 shows particles of uranium dioxide (80 microns) with an 8-micron thick coating of tantalum (540x magnification), and FIG. 4 illustrates tantalum-coated (8 microns) uranium dioxide cores (160 microns) (213x magnification).

It will be noted that the uranium dioxide cores of these particles are generally spherical, but it is to be understood that rough porous particles are also useful in the practice of this invention. Such rough porous core particles provide an increased surface area for the valve metal coating thereon and may therefore be advantageous in this regard.

The coating discontinuities in the particles with the 2-micron coatings (FIGS. 1 and 2) are quite visible, but, in the 8-micron coated particles of FIGS. 3 and 4, they are not readily apparent. However, there are numerous discontinuities or openings typically following tortuous paths through the coatings of these latter particles, but because of the nature of such paths they are not readily observable. In any event whether the coating has a substantial number of openings or whether indeed it has few or none, the subsequent step of compressing these particles into a porous mass will crack or split the thin coatings to form such discontinuities.

A solution of benzene and stearic acid (0.5 percent by weight) was added to portions of the above-described particles of FIGS. 1-4, each of which mixtures was stirred until the benzene completely evaporated. The stearic acid serves as a lubricant to facilitate the compression of the particles. One-gram green (i.e. compressed, but not sintered) pellets three-sixteenths inch in diameter were then prepared by compressing at a pressure of 50 tons/sq. in. The resultant green densities were as shown in Table I.

TABLE I

| Thickness ($\mu$) | | Dg (Green Density) | Weight Loss % | % Core Material Effectively Leached |
|---|---|---|---|---|
| Metal | Core | | | |
| 2 | [ 80 | 8.5 | 83% | 100% |
|   | [ 160 | 8.6 | 87% | 98% |
| 8 | [ 80 | 10.0 | 10% | 22% |
|   | [ 160 | 9.4 | 52% | 81% |

The pellets were then sintered in a vacuum at 1,900° C. for 30 minutes. Subsequently, the pellets were leached with concentrated nitric acid for 56 hours. After this time period, no further leaching of the uranium dioxide was evident when the pellets were treated with fresh nitric acid. The resulting pellets were rinsed repeatedly with hot distilled water and then repeatedly with cold distilled water. They were then dried at 210° C. for 30 minutes. The pellets of compressed leached particles had the percentage weight losses shown in Table I, indicating that the percentages of core material shown had been effectively dissolved away thereby to expose the inner surfaces of the valve metal coatings. From a study of this table, it is apparent that the 2-micron thick coatings permitted more effective leaching of the core than did the 8-micron coatings, although substantial leaching was achieved with the 8-micron coated particle pellets. It will be understood that selective solvent materials other than nitric acid are useful in the practice of this invention. Any material which will selectively attack the core without significantly attacking the valve metal coating and without forming any products insoluble in the material may be employed.

The resultant porous pellets were then anodized in 0.01 percent by volume phosphoric acid (specific resistance: 2,250 ohm-cm.) at a constant current of 15 milliamps per anode at 92° C. to a maximum anodization potential of 100 volts for the tantalum on uranium dioxide. Tantalum sheet was used as the cathode material. The pellets were held at 100 volts for 2 hours, after which they were discharged by shorting the anode and cathode leads through a 1,000-ohm resistor.

The anodized pellets were rinsed in deionized water for one-half hour, then dried at 85° C. for one-half hour.

The anodized porous pellets were then electrically tested with the results shown in Table II.

TABLE II

| Thickness ($\mu$) | | DCL | C | DF | ESR | VBD |
|---|---|---|---|---|---|---|
| Metal | Core | ($\mu$a) | ($\mu$fd) | (%) | (ohms) | (range) |
| 2 | [ 80 | 0.52 | 12.5 | 7.0 | 7.4 | 190–202 |
|   | [ 160 | 0.70 | 7.2 | 4.6 | 8.4 | 245 |
| 8 | [ 80 | 1.20 | 5.3 | 6.7 | 16.8 | 248–262 |
|   | [ 160 | 4.20 | 5.4 | 8.4 | 20.5 | 262–290 |

The test cell was a 100-ml. beaker with a hollow cylindrical platinized-silver cathode, about 1.5 inches in diameter and 2.0 inches high, and thus having an inside surface area of about 9.5 square inches. The electrolyte in the test cell was 10 percent phosphoric acid by volume (specific resistance: 15 ohm-cm.) (142 grams of phosphoric acid per liter), at 25° C.

Each pellet was suspended in the center of the cathode and the d.c. leakage current (DCL) was measured after 2 minutes at 70 volts. Capacitance (C) and dissipation factors (DF) were measured (after discharging residual voltage from the leakage test) at 120 cycles per second with an a.c. signal of 0.5 volts (measured across the test cell) and no d.c. bias. The equivalent series resistance (ESR) was determined from the capacitance and dissipation factors.

For the voltage breakdown (VBD) test, conditions were the same as for the anodization with the anodized film being formed at constant current until breakdown of the film occurred.

As shown in Table II, the direct current leakage or DCL in microamps was lowest for the 2-micron coating on the 80-micron core, and then increased, with the highest leakage occurring with the 8-micron coating on the 160-micron core. Similarly the capacitance or C in microfarads was highest for the thin coating on the small core, and then decreased as the core thickness increased or as the film thickness increased.

The dissipation factor, or DF, desirably should be as low as possible in that it is a measure of power dissipation within the capacitor. The lowest percent was achieved by the 2-micron coating on the 160-micron core.

The equivalent series resistance or ESR in ohms showed the expected trend, with the 2-micron coating on the 80-micron core exhibiting the best value. The voltage breakdown or VBD values show the lowest range for the 2-micron coating on the 80-micron core, with the values then increasing as the core thickness or the film thickness increased.

Theoretical calculations of expected capacitance were made utilizing a known empirical relationship between surface area and capacitance for the tantalum.

One surface $$\frac{C(\mu f)}{\text{anode}} = \frac{6.10^4 . Dp^2 . 0.1085}{Pm(Dp^3 - Dc^3) + PcDc^3}$$

Dual surface $$\frac{C(\mu f)}{\text{anode}} = \frac{6.10^4 (Dp^2 + Dc^2) . 0.1085}{Pm(Dp^3 - Dc^3) + PcDc^3}$$

where

Dp = observed sphere diameter (Ta+UO$_2$), cm
Dc = core diameter (UO$_2$), cm
Pm = density of tantalum (16.6 gm/cm$^3$)
Pc = density of uranium dioxide (11.0 gm/cm$^3$)
Factor (0.1085) = empirical relation between surface area and capacitance (dimensions = $\mu$f/cm$^2$ when 100 volt formation employed)

An anode weight of one gram, a leaching efficiency of zero in the one surface equation, and a leaching efficiency of 100 percent in the dual surface equation were assumed in preparing the above equations.

The comparison of observed capacitance with theoretical is shown in Table III.

TABLE III

| Thickness ($\mu$) | | Leach. Eff. (%) | Capacitance ($\mu$f/anode) Observed | Capacitance ($\mu$f/anode) Theoretical | |
|---|---|---|---|---|---|
| Metal | Core | | | One surface | Dual surface |
| 2 | [ 80 | 100 | 12.5 | 6.6 | 12.6 |
|   | [ 160 | 98 | 7.2 | 3.5 | 6.8 |
| 8 | [ 80 | 22 | 5.3 | 5.1 | 8.6 |
|   | [ 160 | 81 | 5.4 | 3.0 | 5.4 |

The data shows the capacitance characteristics to be a function of leaching efficiency, and hence the degree to which the inner surfaces of valve metal coatings have been exposed. With complete, or nearly 100 percent leaching, of the core material (i.e., when the layer of valve metal was only 2 microns thick) correspondence between observed and dual surface capacitances is remarkably close. With 22 percent leaching the observed capacitance shows some contribution from the inner surface. Finally, with 81 percent leaching efficiency the observed capacitance indicates a very substantial contribution from the exposed internal surface. The capacitance values shown are in microfarads per gram of valve metal.

As indicated above particle core materials other than uranium dioxide are useful in the practice of this invention. Similarly, selective solvent materials other than nitric acid may be used to remove the core material. For example, readily or rapidly soluble salts of thorium may be formed by using hydrobromic, hydrochloric and hydriodic acids as well as nitric acid. Also, acetic, hydrobromic, hydrochloric and nitric acids will serve as effective selective solvents by forming highly soluble salts of lanthanum.

In view of the above, it will be seen that the several objects of the invention are achieved and other advantageous results attained.

As various changes can be made in the above methods and products without departing from the gist of the invention, it is intended that all matter contained in the above description or shown in the accompanying drawings be interpreted as illustrative.

What is claimed is:

1. An anode for an electrolytic capacitor comprising a porous electrically interconnected mass of particles, said particles comprising discontinuous substantially hollow bodies of valve metal, the inner and outer surfaces of said valve metal bodies having a dielectric oxide film thereon.

2. An anode as set forth in claim 1 wherein the valve metal is selected from the group consisting of niobium, tantalum, aluminum, tungsten, hafnium, titanium, zirconium, and alloys thereof.

3. An anode as set forth in claim 1 wherein the thickness of the valve metal forming said bodies is not greater than about 8 microns.

4. An anode as set forth in claim 1 wherein the size of said hollow bodies is not greater than about 160 microns.

* * * * *